Patented Feb. 6, 1951

2,540,526

UNITED STATES PATENT OFFICE 2,540,526

INTERNAL-COMBUSTION TURBINE POWER PLANT

Alun Raymond Howell, Neath, England, assignor to Power Jets (Research and Development) Ltd., London, England, a British company Application January 31, 1945, Serial No. 575,535
In Great Britain January 31, 1944

3 Claims. (Cl. 60—41)

1

This invention relates to internal combustion turbine power plants operating on the constant pressure cycle with continuous flow, and having a compressor discharging into combustion chamber means, into which fuel is injected and burnt at constant pressure, and a turbine in which the products of combustion are expanded to a lower pressure, the compressor being driven by the turbine, and in which the turbine and compressor are of the axial flow type.

More especially the invention contemplates the installation of power plants, of the kind first herein referred to, as aircraft prime movers, wherein the turbine exhaust is utilised by means of jet reaction nozzles to produce thrust.

An object of the invention is the provision of a power plant of the kind herein referred to which is of compact construction, and especially such as is adapted for convenient accommodation in an aircraft nacelle or fuselage, having especially in view a reduction of overall axial length, having regard to the requisite combustion chamber length thus avoiding the need for employing great lengths of shafting involving considerable weight, not only of the shaft itself but of the supporting structure.

How the foregoing objects and others as will hereinafter appear are attained and in what manner the invention may be performed will be understood from the following description given by way of example and having reference to the accompanying drawings of an embodiment of the invention, the scope of which is defined in the appended claims.

Figure 1:
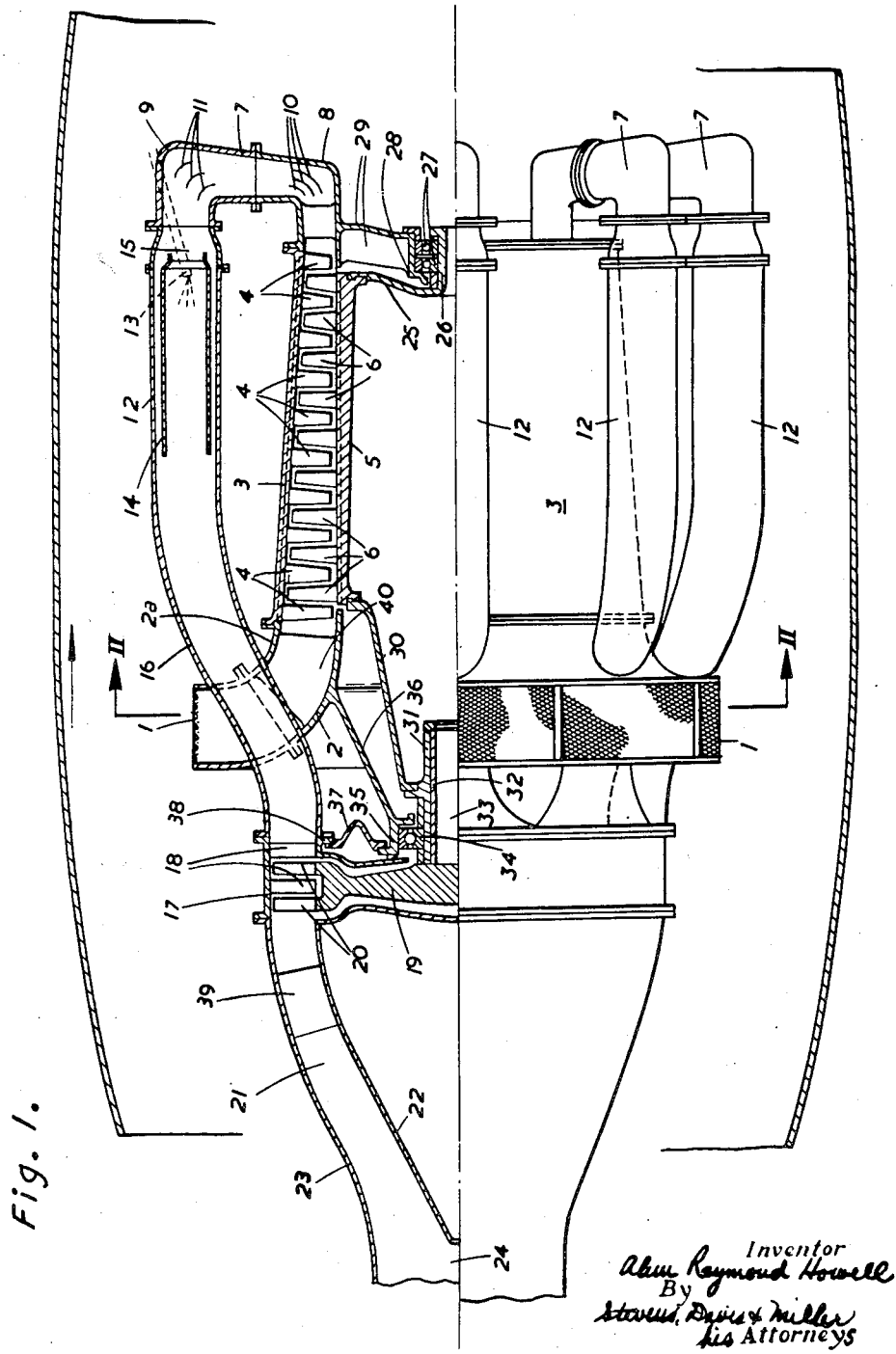
Figure 2:
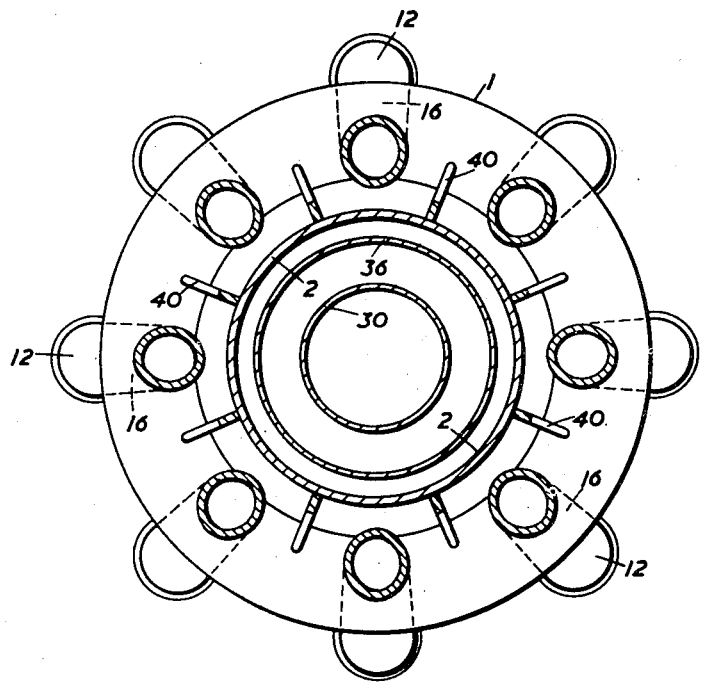

In the accompanying drawings, Fig. 1 shows (partly diagrammatically) in half axial section an internal combustion turbine unit intended for installation in an aircraft as a jet propulsion motor, and Fig. 2 is a cross-sectional view taken on the line II—II of Fig. 1.

Referring to these drawings, the flow duct for the working fluid is defined by an air intake 1 leading to an annular entry space defined by an inner and outer ring members 2, 2a, an annular compressor duct defined by a stator casing 3 and rotor drum 5, a duct 7 having two elbows at 8 and 9 bringing about a 180° reversal of flow, an annular arrangement of circumferentially-spaced chambers such as are shown in Figure 1 or an annular combustion chamber, a duct 16 leading to a turbine duct defined by a turbine stator casing 17 and the rim of a turbine wheel 19, and an annular duct 21 defined by an outer fairing 23 and an inner cone-shaped fairing 22, and delivering into a jet pipe 24, situated beyond the apex

2 of the cone 22 and leading to a jet reaction nozzle (not shown).

The ring members 2, 2a defining the air entry are structurally connected by integral webs 40, which also serve as entry guide vanes to the compressor duct.

The compressor stator casing 3 carries inwardly projecting stator blades 4 interdigitating with rotor blades 6, mounted on the periphery of the drum 5, and together constituting a multistage axial flow compressor.

The elbows 8 and 9 of the duct 7 are provided with curved vanes 10, 11, respectively, serving to guide the air flow round the elbows and eliminate turbulence.

Within the combustion chamber 12, is situated a fuel injection nozzle 13, and a flame tube 14, open at its upstream end 15, for admission of primary air to the fuel nozzle and defining a space between itself and the wall of the combustion chamber 12, along which secondary air passes.

The turbine stator 17 is provided with two rows of inwardly projecting turbine stator blades 18 and the turbine wheel 19 is provided with two rows of turbine rotor blades 20, thus providing two turbine stages.

The compressor rotor drum 5 is secured at one end to a diaphragm 25, which is integral with a shaft 26, and at the other end to a conical member 30 secured to a sleeve 31, co-axial with the shaft 26. The latter is supported by bearings 27 in a housing 28, connected by means of a webbed diaphragm 29 with the casing member 7 enclosing the double elbow duct.

The turbine wheel 19 is formed integrally with a shaft 33 and the sleeve 31 is driven by turbine shaft 33 through a splined coupling 32 and is supported by a bearing 34 in a housing 35, connected to the entry ring member 2 by an integrally formed conical web 36 and to a ring member 38 by means of a diaphragm 37, which is corrugated to accommodate expansion effects. The last named member 38, together with the turbine stator casing 17 defines the entry annulus of the turbine, and the inner ends of the first stage of turbine stator blading 18 are secured to or located by the ring 38.

The cone fairing 22 is supported from the outer fairing 23 by means of radial webs 39 which serve also as flow straighteners for the turbine efflux passing along the annular duct 21.

An arrow indicates the direction of flight when the unit is installed in an aircraft as a jet propulsion motor. It will be seen that in this arrangement the combustion chamber or chambers are placed alongside and outside of the compressor component, the air flow after leaving the compressor being subjected to a complete reversal through 180°; further, that the turbine component is in close juxtaposition with the compressor which it drives, the direction of flow through the turbine, being opposite to that through the compressor. The arrangement permits of considerable overall shortening of the axial length of the unit and of general compactness, which is favourable for installation as an aircraft power plant.

In the example illustrated the turbine is coupled solely to the compressor and absorbs from the expanding gases only so much power as is required to drive the compressor, and the whole available residual power of the gases after passing the turbine is employed in creating thrust by means of a reaction jet nozzle. The turbine may, however, be also coupled to an external load of any suitable character, or may be applied for purposes other than aircraft propulsion, without departing from the concept of the invention.

What I claim as my invention and desire to secure by Letters Patent is:

1. A gas turbine aircraft power unit comprising an axial flow multistage compressor which supplies motive fluid to an axial flow gas turbine which drives it, said compressor and turbine being coaxially arranged with the inlets thereto annularly disposed at adjacent ends and outlets at the remote ends thereof so that the flows therethrough are in opposite directions, and with the compressor located ahead of the turbine (considered in relation to the intended direction of flight) so that the flow through the compressor is in the intended direction of flight, annularly disposed ducting leading through a turn of approximately 180° in a plane including the axis of the unit from the discharge (front) end of the compressor to the inlet (front) end of the turbine, said ducting including heating means for the working fluid and annularly surrounding the body and inlet end of the compressor and forming in the region of said inlet end circumferentially spaced gas passages to said turbine, the spaces between said gas passages being utilized for air entry to said inlet, whereby there is intersection of flow paths of air entering the compressor and gas entering the turbine.

2. An internal combustion turbine power plant comprising an axial flow multistage compressor, an axial flow turbine coaxial with and directly coupled to drive said compressor, said compressor and turbine being provided with inlets at their adjacent ends and outlets at their remote ends so that the flows therethrough are in opposite directions, annularly disposed air duct means leading from said remote outlet end of the compressor through a radially outward turn of substantially 180° in a plane including the axis, annularly disposed combustion chamber means coaxially surrounding said compressor, and annularly disposed gas ducting means connecting said combustion chamber means to the inlet of said turbine for flow through the turbine in a direction away from the compressor, said gas ducting means annularly surrounding the inlet end of said compressor and forming in the region of said inlet end circumferentially spaced gas passages to said turbine, the spaces between said gas passages being utilized for air entry to said inlet, whereby there is intersection of flow paths of air entering the compressor and gas entering the turbine.

3. An internal combustion turbine power plant comprising an axial flow multistage compressor, a turbine coaxial with said compressor axially spaced from the entry end thereof, said compressor and turbine being provided with inlets at their adjacent ends and outlets at their remote ends so that the flows therethrough are in opposite directions, coupling means to transmit rotational drive directly from said turbine to said compressor, annularly disposed ducting containing combustion means and coaxially surrounding said compressor, said ducting having connections to receive air from the outlet end of said compressor and to deliver gaseous combustion products into said turbine in an axial direction opposed to that of the airflow through the compressor, of which connections that leading to the turbine annularly surrounds the inlet end of said compressor and forms in the region of said inlet end circumferentially spaced gas passages to said turbine, the spaces between said gas passages being utilized for air entry to said inlet, whereby there is intersection of flow paths of air entering the compressor and gas entering the turbine.

ALUN RAYMOND HOWELL.

REFERENCES CITED

The following references are of record in the file of this patent:

UNITED STATES PATENTS

| Number | Name | Date |
| --- | --- | --- |
| 2,050,349 | Lysholm et al. | Aug. 11, 1936 |
| 2,080,425 | Lysholm | May 18, 1937 |
| 2,085,761 | Lysholm | July 6, 1937 |
| 2,256,198 | Hahn | Sept. 16, 1941 |
| 2,326,072 | Seippel | Aug. 3, 1943 |
| 2,409,177 | Allen | Oct. 15, 1946 |
| 2,430,399 | Heppner | Nov. 4, 1947 |
| 2,469,439 | Lundquist | May 10, 1949 |

FOREIGN PATENTS

| Number | Country | Date |
| --- | --- | --- |
| 796,274 | France | Jan. 22, 1936 |
| 210,658 | Switzerland | Oct. 1, 1940 |